(12) United States Patent
Lariviere et al.

(10) Patent No.: US 7,477,822 B2
(45) Date of Patent: Jan. 13, 2009

(54) COMPONENT WITH OPTICAL FIBER AND ASSOCIATED OPTICAL FIBER

(75) Inventors: Damien Lariviere, Douai (FR);
Sebastien Andre, Pignan (FR);
Stephane Gauchard, Bourg la Reine (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/876,209

(22) Filed: Oct. 22, 2007

(65) Prior Publication Data

US 2008/0050080 A1    Feb. 28, 2008

Related U.S. Application Data

(62) Division of application No. 11/155,587, filed on Jun. 20, 2005, now Pat. No. 7,308,179.

(30) Foreign Application Priority Data

Jun. 18, 2004    (FR) .................................. 04 51188

(51) Int. Cl.
*G02B 6/36* (2006.01)
(52) U.S. Cl. .................. 385/128; 385/123; 385/126; 385/127
(58) Field of Classification Search .................. 385/123, 385/126, 127, 128
See application file for complete search history.

(56) References Cited

U.S. PATENT DOCUMENTS

| 4,842,369 A | 6/1989 | Teshima et al. |
| 4,848,869 A | 7/1989 | Urruti |
| 5,240,004 A | 8/1993 | Walinsky et al. |
| 6,347,174 B1 | 2/2002 | Onishi et al. |
| 6,373,868 B1 | 4/2002 | Zhang |
| 6,652,975 B2 | 11/2003 | Kuck et al. |
| 6,959,135 B1 | 10/2005 | Bickham et al. |
| 2003/0133679 A1 | 7/2003 | Murphy et al. |
| 2003/0199603 A1 | 10/2003 | Walker et al. |
| 2005/0254765 A1 | 11/2005 | Seifert et al. |
| 2006/0072875 A1 | 4/2006 | Bhagavatula et al. |

FOREIGN PATENT DOCUMENTS

| EP | 0475369 A1 | 9/1991 |
| GB | 2 313 330 A | 11/1997 |
| JP | 53131851 | 11/1978 |
| JP | 61-186906 | 8/1986 |

*Primary Examiner*—James P Hughes
(74) *Attorney, Agent, or Firm*—Sughrue Mion, PLLC

(57) ABSTRACT

The invention relates to the field of components with optical fibers and of associated optical fibers. The invention relates, on the one hand, to a component with optical fiber including an at least partly bent optical fiber (2) which successively comprises, from the center to the periphery, an optical core (10) based on silica, an optical cladding (11) based on silica, and a coating (12) having a transparency to infrared radiation larger than 85%. On the other hand, the invention relates to an optical fiber, successively comprising, from the center to the periphery, an optical core (10) based on silica, an optical cladding (11) based on silica, and a coating (12) having a transparency infrared radiation larger than 85%.

11 Claims, 1 Drawing Sheet

FIG_1
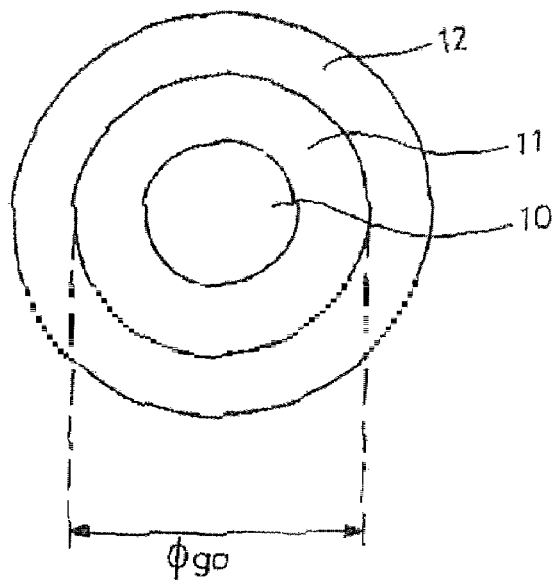
$\phi go$
FIG_2
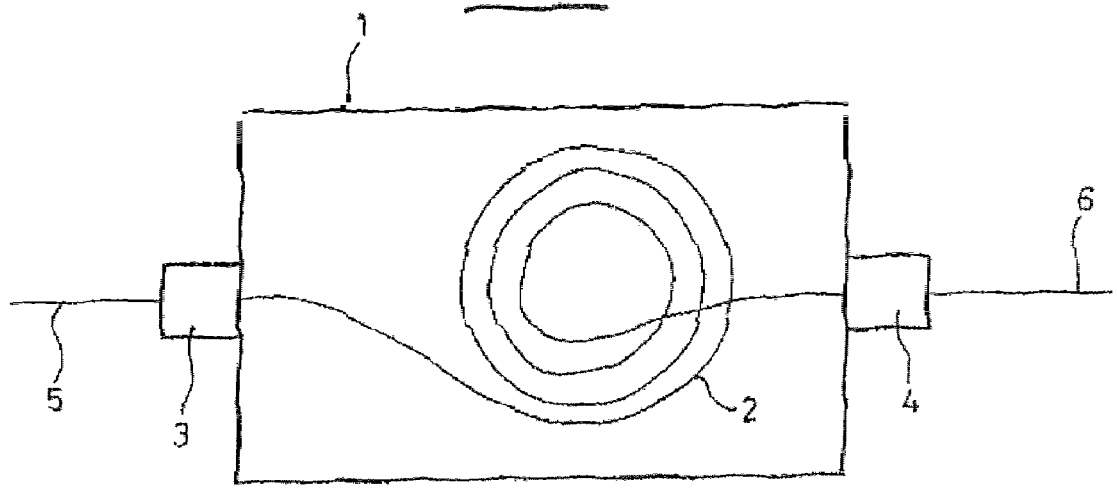

COMPONENT WITH OPTICAL FIBER AND ASSOCIATED OPTICAL FIBER

This is a divisional of application Ser. No. 11/155,587 filed Jun. 20, 2005 now U.S. Pat. No. 7,308,179. The entire disclosure of the prior application, application Ser. No. 11/155,587 is considered part of the disclosure of the accompanying divisional application and is hereby incorporated by reference.

BACKGROUND OF THE INVENTION

The invention relates to the field of components with optical fibers and associated optical fibers. The invention in particular relates to the field of components with optical fibers and associated optical fibers, when the optical fibers are at least partly bent with small radii of curvature on the one hand and on the other hand intended for conveying significant optical energy. The optical fiber is bent with a small radius of curvature, notably at the output connection or else when the casing into which it is inserted, is that of a miniaturized component. In this type of component, the optical losses at the optical fiber level are significant.

U.S. Pat. No. 6,373,868 relates to a method for configuring a standing-wave cavity arrangement for solid-state lasers in obtaining stable single-mode operation, whereby overcoming the major difficulty, with intracavity frequency conversions, typically in frequency doubling caused by the so-called "green problem".

GB 2,313,330 relates to an optical fiber for use in carrying out spectral analysis, wherein the fiber is provided with a protective coating which is formed from a material which is substantially non-absorbent to radiation in the infra-red range.

US 2003/0133679 relates to an optical fiber comprising a flame retardant UV light-curable tight-buffer coating, which is substantially halogen-free and has a limiting oxygen index of at least 20%, and wherein the tight-buffer coating has an optical transparency of at least 75% at a wavelength of 400-800 μm.

EP 0 475 369 relates to an apparatus for measuring and controlling the eccentricity of the colored coating layer of optical fibers, wherein the measurement is made by analyzing the interference patterns obtained by launching onto the fiber two monochromatic light beams which are perpendicular to each other and to the optical fiber axis. The pigmented polymers have the characteristic of being practically transparent in the portion of the optical spectrum ranging from 850 nm to 2500 nm" belonging to the near infra-red.

According to the prior art, for an optical fiber, conveying a significant optical energy while being bent with a small radius curvature, is a matter for a compromise impossible to achieve. Indeed, either the radius of curvature of the bent optical fiber is small and then the optical energy to be conveyed by the optical fiber must then be limited, or the optical energy to be conveyed by the optical fiber is high and then the reduction of the radius of curvature of the bent optical fiber must be limited, i.e. the miniaturization of the component must be limited. The problem of increasing the optical energy to be conveyed in the optical fiber while reducing the radius of curvature of the bent optical fiber lies in the fact that the energy absorbed in the coating of the optical fiber is thereby increased a great deal, which coating not withstanding a very high internal temperature, is then degraded rapidly.

Examples of such coatings are notably:

UV-polymerized coatings based on urethane-acrylate;

coatings based on siliconized polymer such as those described in U.S. Pat. No. 6,652,975 or in Patent Abstract of Japan JP 53131851 which are polymerized by heat and not by ultraviolet radiation;

multilayer coatings based on siliconized polymer on the one hand and on siliconized polyimide on the other hand, such as those described in U.S. Pat. No. 4,848,869 which are polymerized by heat and not by ultraviolet radiation.

Patent Abstract of Japan JP 61186906 describes a coating based on siliconized polymer for a plastic optical fiber, the optical core of which is not based on silica.

Patent Application US 2003/0,199,603 describes an optical fiber coating which is transparent to ultraviolet radiation.

SUMMARY OF THE INVENTION

A first solution for solving the problem of the prior art, would consist of making an optical fiber coating which would withstand high internal temperatures. This is not the way chosen by the invention. The solution of the invention is compatible with optical fiber coatings which do not withstand high internal temperatures. The internal temperature of the coating is the temperature inside the coating which differs from the room temperature which is the temperature outside the coating. Indeed, the solution of the invention consists of very strongly reducing the absorbed energy in the coating of the optical fiber and not in the increasing of the resistance to the internal temperature of the coating of the optical fiber; for this, the solution of the invention consists of significantly increasing the transparency to infrared radiation of the coating of the optical fiber. Thus, the major part of the optical energy conveyed by the optical fiber and passing into the coating of the optical fiber crosses this coating without being absorbed and will dissipate itself outside this coating, thereby avoiding degradation of this coating and thereby leaving this coating practically intact. The coating is made transparent in the infrared spectral band(s) used for conveying the optical signals in the relevant application. The invention relates to the obtained optical component as well as to the optical fiber which it contains.

According to the invention, a component with optical fiber is provided, including an at least partly bent optical fiber which is intended to convey optical energy at a wavelength and which successively comprises, from the center to the periphery, an optical core based on silica, an optical cladding based on silica and a coating, characterized in that the coating of the optical fiber has a transparency to infrared radiation larger than 85% at said wavelength.

According to the invention, more specifically, provision is or a component with optical fiber including an at least partly bent optical fiber, which is intended for conveying optical energy at one wavelength and which successively comprises, from the center to the periphery, an optical core in at least partly doped or non-doped silica, an optical cladding in at least partly doped or non-doped silica and a coating, characterized in that the radius of curvature of at least one portion of the length of the bent optical fiber is less than or equal to 10 mm, and in that the coating of the optical fiber has a transparency infrared radiation, at said wavelength, which is larger than 85% so that the temperature of the optical fiber does not remain too high during the operation of the component, sufficiently to avoid any damage to the coating.

According to the invention, provision is also made for an optical fiber successively comprising, from the center to the periphery, an optical core based on silica, an optical cladding based on silica, and a coating, characterized in that the coating has a transparency to infrared radiation larger than 85%.

More specifically according to the invention, provision is also made for an optical fiber successively comprising, from the center to the periphery: an optical core in at least partly doped or non-doped silica; an optical cladding in at least partly doped or non-doped silica; a polymerized coating having been obtained by polymerization with ultraviolet radiation by means of a catalyst photo-initiating the polymerization; characterized in that the concentration, in the coating, before polymerization, of the catalyst is sufficiently low so that the polymerized coating has a transparency to infrared radiation which is larger than 85% at at least one of the wavelength belonging to the set of wavelengths: 980 nm, 1.060 nm, 1.117 nm, 1.260 nm, 1.360 nm 1.390 nm, 1.450 nm, 1.480 nm, 1.550 mm.

The invention will be better understood and other features and advantages will become apparent by the description hereafter and the appended drawings given by way of examples, wherein:

BRIEF DESCRIPTION OF THE DRAWINGS

FIG. 1 schematically illustrates a sectional view of an exemplary optical fiber according to the invention;

FIG. 2 schematically illustrates an exemplary optical component according to the invention.

DETAILED DESCRIPTION OF THE INVENTION

FIG. 1 schematically illustrates a sectional view of an exemplary optical fiber according to the invention. The optical fiber comprises an optical core 10, an optical cladding 11 and a coating 12. The diameter of the optical cladding is illustrated in FIG. 1. The optical core 10 and the optical cladding 11 are based on silica, i.e., they substantially consist of silica to which one or several dopants may have been added i.e., they are in silica which is either at least partly doped or non-doped, wherein doping may be non-uniform along a radius in optical core and/or in the optical cladding. Therefore, the optical fiber is not a so-called plastic optical fiber, i.e., wherein the core material is based on an organic polymer material. The coating 12 may be mono-layered or multi-layered. The coating 12 is formed by the whole set of coating layers which all have the property of high transparency infrared radiation. Typically, the coating 12 notably includes the primary coating and the secondary coating. In cases of overcladding of the cable type or of the jumper type, the latter also has a certain transparency to infrared radiation so as to avoid deterioration of this overcladding by dissipation of energy in this overcladding.

FIG. 2 schematically illustrates an exemplary optical component according to the invention. The optical component comprises a casing 1 in which an optical fiber 2 is coiled, at least a portion which is bent with a radius of curvature Rc. Rc represents the radius curvature of the most bent portion of the optical fiber 2. The optical component comprises an input terminal 3 and an output terminal 4. The input terminal 3 is connected to an upstream optical fiber 5, The output terminal 4 is connected to a downstream optical fiber 6. The signal arrives from the upstream optical fiber 5 and again leaves through the downstream optical fiber, 6 after having crossed the optical component.

The coating of the optical fiber has a transparency to infrared radiation larger than 85%. In order that there be even less energy absorbed in the coating of the optical fiber and even this when the energy capable of being conveyed by the optical fiber increases and when the radius of curvature decreases, the coating of the optical fiber preferably has a transparency to infrared radiation larger than 90% and advantageously larger than 95%. More specifically, these minimum thresholds of the coating of the optical fiber for transparency to infrared radiation, which range from 85% to 95%, are at least met for the power wavelength(s) of the optical component, which may either be pumping wavelengths or signal wavelengths at which relatively significant optical energy propagates in the optical fiber. Preferably, this optical energy is either necessary for optical pumping, this is then optical pumping energy, or derived from optical pumping, this is then the energy of the signal amplified by pumping.

The signal wavelength preferably is 1.550 nm. The pumping wavelengths may be 980 nm (plus or minus 10 nm) for erbium type or ytterbium type pumping, 1,060 nm (plus or minus 10 nm) for an ytterbium type pumping which may involve optical powers ranging from 5 W to 20 W. 1.117 nm (plus or minus 10 nm) for an ytterbium type pumping which may involve optical powers ranging from 5 W to 20 W, 1.260 nip (plus or minus 10 nm) for Raman type pumping, 1.360 nm (plus or, minus 10 nm) for Raman type pumping, 1.390 nm (plus or minus 10 rim) for a Raman type pumping, 1.450 nm (plus or minus 10 nip) for a Raman type pumping, 1,480 pm (plus or minus 10 nm) for an erbium type or Raman type pumping. The transparency to infrared radiation may be located at one or several or all of these pumping wavelengths. The coating is transparent to infrared radiation at the pumping wavelength(s) as it is at this (or these) pumping wavelength(s) that optical energy is absorbed in the coating. In a preferential embodiment related to erbium type pumping, the transparency to infrared radiation is at pumping wavelengths of 980 nm and 1.480 nm or at only one of them. In another preferential embodiment related to the ytterbium pumping type, the transparency to infrared radiation is at all the wavelengths of 980 nm, 1.060 nm, 1.117 nm, or only one of them or at only some of them. In still another preferential embodiment related to the Raman pumping type, the transparency infrared radiation is at all the wavelengths of 1.260 nm, 1,360 mn, 1.390 nm, 1,450 nm or at only one of them or at only some of them. In the coatings from the prior art, this transparency was at the most equal to 70%. The optical fiber coating has a minimum threshold for transparency to infrared radiation so that the temperature of the optical fiber remains sufficiently relatively low during operation of the component to avoid any damage to the coating. Preferably, the temperature of the coating of the portion of the optical fiber which is located inside the component does not rise, during operation of the component, to more than 10° C. above the room temperature prevailing inside the component.

The radius of curvature of at least a portion of the length of the bent optical fiber in the component is equal to or less than 10 mm, and preferably less than 8 mm. Thus, the component may appear in a very miniaturized form.

Preferably, the component is active and the emitting optical power of the component is larger than or equal to 500 mW, advantageously larger than 1 W, advantageously larger than 5 W. The active component for example, is an amplifier, for example of the erbium doped optical fiber type, or for example an emitter.

If the component is an erbium doped fiber amplifier (EDFA), it is especially important that it is the line optical fiber connected to the erbium doped amplifying fiber, which has a coating according to the invention, as for the erbium doped fiber, it confines the signal in its core sufficiently in order to avoid absorption of a significant portion of the energy in the coating. The wavelength at which the coating is highly transparent, is then the wavelength of an amplified signal, i.e., typically 1.550 nm.

If the component is a Raman card, the portion of line fiber which it contains, subjected to significant optical powers, i.e., conveying significant optical energies, has a coating according to the invention. The wavelength at which the coating is highly transparent is then the pumping wavelength.

Preferably, the coating of the optical fiber is a polymerized coating which has been obtained by polymerization with ultraviolet radiation by means of a catalyst-photo-initiator of the polymerization. For this type of coating, the presence of the catalyst is essential to good progress of the polymerization reaction. However, this catalyst has the particularity of being absorbent for infrared radiation, More specifically, the catalyst is more often decomposed during the reaction, but its constituents, always present after the polymerization reaction, are themselves absorbent for infrared radiation. In this case, the concentration of the catalyst in the coating before polymerization is chosen to be sufficiently low so that the polymerized coating has o transparency to infrared radiation, which is larger than 85% over the spectral range of use and preferably over the spectral range extending from 1.400 nm to 1.600 nm. Preferably, this catalyst concentration is between 0.2% and 1.5% by weight. This catalyst concentration is advantageously between 0.3% and 1.0% by weight. This concentration of the catalyst is for example between 0.35% and 0.50% by weight. In coatings of this type existing in the prior art, the catalyst concentration was of the order of 3% by weight.

The invention is particularly interesting for optical fibers, the optical cladding of which has a small diameter, as these optical fibers may be caused to be subjected to particularly small radii of curvature, being mechanically more resistant. These optical fibers are particularly interesting for making miniaturized components. The external diameter of the optical cladding preferably is less than 100 µm. The external diameter of the optical cladding advantageously is about 80 µm).

The coating preferably consists of a majority of material, polymerizable with ultraviolet radiation, for example in an amount of at least 95%, the remainder consisting of catalytic photoinitiator and/or reactive diluents, for improving the cross-linking rate as well as the mechanical properties of the polymerized coating, and/or additives, such as anti-foam agents, anti-ageing agents, adhesion promoters, to the extent that all these other elements do not exhibit too strong absorption for infrared radiation.

The material essentially consisting of the coating preferably belongs either to the family of siliconized polymers, obtained by polymerization of a photo-crosslinkable silicone precursor, or to the family of fluorinated polymers, obtained by polymerization of a photo crosslinkable fluorinated polymer precursor.

Here are a few examples of a photo-crosslinkable silicone precursor: Ebecryl 350®, Ebecryl 1360®, from UCD; UVS-500® from Croda; Additive 97-I68n®), Additive 97-169®, Additive 99-622 Rahn® from Genomer; Rad 2100®, Rad 2200®, Rad 2500® Rad 2600®, Rad 2700® from Tego Chemie; DMS-U22® from Gelest; the products of the Silcolease UV range from Rhodia, for example Silcolease UV RCA 250®, Silcolease UV RCA 251®; DMS-R01®, DMS-R05® DMS-R18® DMS-R22® DMS-R31® from Gelest; poly[dimethylsiloxane-co-[2-/3,4-epoxycyclohexyl)ethyl]methylsiloxane] from Aldrich.

Here are a few examples of a photo-crosslinkable silicone fluorinated polymer precursor: Foralkyl AC6® (3,3,4,4,5,5,6,6,7,7,8,8,8,8-trifluoro-octyl acrylate [17527-29-6]), AC8® (3,3,4,4,5,5,6,6,-7,7,8,8,9,9,10,10,10-hepta-fluorodecyl acrylate [27905-45-9]-, MAC6® (3,3,4,4,5,5,6,6,7,7,8,8,8-tridecafluoro-octyl methacrylate (2144-53-8)) or MAC8® (3,3,4,4,5,5,6,6,7,7,8,8,9,9,10,10,10-hepta-fluorodecyl methacrylate [1996-88-9]), ATRIFE® (trifluoroethyl acrylate or MATRIFE® (trifluoroethyl methacrylate) from ATOFINA; the (meth)acrylates containing fluorine atoms;; thermoplastic polymers selected from polyvinylidene fluorides (PVDF) and the copolymers of PVF and hexafluoropropene (HFP), notably such as the Knar(®) products from ATOFINA.

What is claimed is:

1. An optical fiber successively comprising, from the center to the periphery, an optical core (10) based on silica, an optical cladding (11) based on silica, and a coating (12), characterized in that the coating has a transparency to infrared radiation larger than 85%.

2. An optical fiber successively comprising, from the center to the periphery:
   an optical core (10) in at least partly doped or non-doped silica;
   an optical cladding (11) in at least partly doped or non-doped silica;
   a polymerized coating (12) having been obtained by polymerization with ultraviolet radiation by a catalyst-photo-initiator of the polymerization;
   wherein the concentration of the catalyst in the coating before polymerization, is sufficiently low so that the polymerized coating has a transparency to infrared radiation which is larger than 85% at at least one of the wavelengths, belonging to the set of wavelengths: 980 nm, 1.060 nm, 1.117 nm, 1.260 nm, 1.360 nm, 1.390 nm 1.450 nm, 1.480 nm, 1.550 nm.

3. The optical fiber according to claim 2, wherein the concentration of the catalyst is between 0.2% and 1.5% by weight.

4. The optical fiber according to claim 3, wherein the concentration of the catalyst is between 0.3% and 1.0% by weight.

5. The optical fiber according to claim 1, wherein the transparency is larger than 90%.

6. The optical fiber according to claim 1, wherein the transparency is larger than 95%.

7. The optical fiber according to claim 1, wherein the external diameter ($f_{go}$) of the optical cladding is less than 100 µm.

8. The optical fiber according to claim 7, wherein the external diameter of the optical cladding is 80 µm.

9. The optical fiber according to claim 1, wherein the coating is based on siliconized polymer.

10. The optical fiber according to claim 1, wherein the coating is based on fluorinated polymer.

11. The component with optical fiber according to claim 1, wherein the component includes an optical fiber.

\* \* \* \* \*